United States Patent [19]
Reudink

[11] Patent Number: 4,891,840
[45] Date of Patent: Jan. 2, 1990

[54] MULTI-CHANNEL SIGNAL TRANSMISSION

[75] Inventor: Douglas O. Reudink, Sea Girt, N.J.

[73] Assignee: American Telephone and Telegraph Company, AT&T Bell Laboratories, Murray Hill, N.J.

[21] Appl. No.: 837,798

[22] Filed: Mar. 10, 1986

[51] Int. Cl.⁴ .............................................. H04B 1/66
[52] U.S. Cl. ........................................................ 381/29
[58] Field of Search .................................. 381/29–33, 381/36–40; 375/122; 358/133; 370/118

[56] References Cited

U.S. PATENT DOCUMENTS

| | | | |
|---|---|---|---|
| 2,941,032 | 6/1960 | Geiger et al. | 358/133 |
| 3,116,374 | 12/1963 | Franco | 381/29 |
| 3,684,838 | 8/1972 | Kahn | 381/29 |
| 3,875,341 | 4/1975 | Gassmann | 381/29 |
| 4,034,160 | 7/1977 | Van Gerwen | 381/29 |
| 4,170,719 | 10/1979 | Fujimura | 381/29 |
| 4,374,304 | 2/1983 | Flanagan | 381/29 |

Primary Examiner—David L. Clark
Assistant Examiner—John A. Merecki
Attorney, Agent, or Firm—Henry T. Brendzel

[57] ABSTRACT

A system for communicating a wide band signal across a plurlaity of narrow band channels by separating the wide band signal into two or more narrower sub-bands and modulating the developed narrower sub-bands down to baseband. The baseband channels are algebraically combined to form unique combination signals, and the combination signals are transmitted over the narrowband channels. On the receiving end, the combination signals are algebraically combined to recreate the original baseband channels. The channels are modulated up to their original frequency bands, and arithmetically combined to recreate the desired broadband signal.

7 Claims, 1 Drawing Sheet

MULTI-CHANNEL SIGNAL TRANSMISSION

BACKGROUND OF THE INVENTION

Conventional telephone circuits provide a frequency bandwidth of up to 3,300 Hz, which is quite adequate for normal voice conversations. Sometimes, the need arises for higher quality transmissions as, for example, in connection with radio broadcasts of conversations carried via telephone lines. When such a need arises and time permits, a specially conditioned line is provisioned by the telephone company to provide a wider bandwidth, e.g., from 300 to 5000 Hz. Conditioning of a telephone line is expensive and time consuming. This is particularly true when a telephone connection is provisioned through a variety of transmission equipment. A telephone connection can be implemented, for example, with a line pair to the central office, an analog carrier from one central office to another, and a digital carrier to still another central office.

In other applications where wide band service is desired, the broadband signal is separated into a plurality of sub-bands by the use of bandpass filters, each sub-band is shifted to baseband, and the baseband signals are transmitted to the destination over separate channels. On the receiving end, the signal of each channel is modulated up to its original frequency band position and the resulting plurality of band limited signals are arithmetically combined to develop the desired broadband signal. Such an approach can be easily applied to the task of obtaining a desired wider bandwidth in the aforedescribed application of radio broadcast transmissions over telephone lines. The problem with this approach, however, is that when transmission over one of the telephone lines is disrupted, an entire band of the original signal is missing at the receiving end, and it cannot be recovered; and when the missing band contains the low frequencies, intelligibility is greatly affected.

It is an object of this invention to provide for high fidelity audio transmission over relatively narrow band telephone lines without the loss of an entire frequency band when one of the telephone line connections fails.

SUMMARY OF THE INVENTION

These and other objects of the invention are realized by separating the wide band signal into two or more narrower band channels and modulating the developed narrower band channels down to baseband. The baseband channels are combined in an algebraic manner to form unique combination signals, and the combination signals are transmitted. On the receiving end, the combination signals are algebraically combined to recreate the original baseband channels. The channels are modulated up to their original frequency bands, and arithmetically combined to recreate the desired broadband signal.

DETAILED DESCRIPTION

Figure 1:
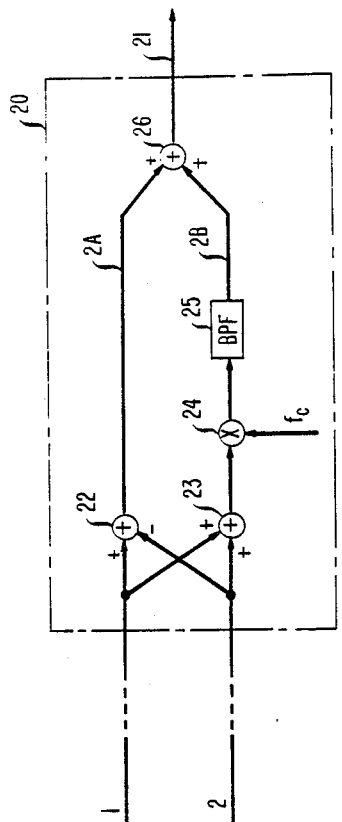
FIG. 1 illustrates transmitting and receiving apparatus employing two channels.

I discovered that a basic algebraic approach to solving multiple equation with multiple unknowns can beneficially be employed to achieve the object of this invention. Given two equations and two unknowns, such as $A+B=K_1$ and $A-B=K_2$, the values of A and B can easily be determined in two steps. In the first step, each equation is multiplied (on both sides) by the coefficient of A and the equations are subtracted from each other; and in the second step, each equation is multiplied (on both sides) by the coefficient of B and the equations are again subtracted from each other. The result of the first step yields $2B=K_1-K_2$ and the result of the second step yields $2A=K_1+K_2$. This approach can of course be expanded to more than two equations with two unknowns each, as taught by algebra texts.

When utilizing the above approach in the context of my invention, it is of great benefit that the coefficient values of the component signals can be selected by the user, thereby simplifying the hardware realizations. This is clearly brought to light in the following discussion, and the accompanying description of two preferred embodiments.

Considering the typical voice spectrum, most of the voice signal energy is found below 3 KHz. Although very little energy exists in the spectrum above 3 KHz, intelligibility and fidelity of the voice signal is greatly enhanced if the energy beyond 3 KHz is also present. In accordance with the principles of my invention, one approach is to divide the bandwidth to be transmitted into two sub-bands: a baseband signal below 3 KHz and a bandlimited signal above 3 KHz. A baseband signal representative of the signal in the upper sub-band is developed and the two baseband signals are combined with coefficients 1 and $-1$ to develop combination signals $A+B$ and $A-B$ as described above.

One could also divide the bandwidth to be transmitted into three sub-bands, develop baseband signals A, B, and C, and transmit combination signals $A+B-C$, $A-B+C$, and $-A+B+C$.

The advantage in sending the combination signals over the transmission channels rather than the baseband signals themselves, lies in the fact that each of the combination signals contains signals that are representative of all the sub-bands. Therefore, a loss of any channel is not catastrophic. In the two channel case, for example, loss of one of the channels leaves either $A+B$ or $A-B$. Although B can neither be recovered nor deleted from $A+B$ alone, the signal $A+B$ is quite intelligible because the energy in B, which contains voice energy above 3 KHz, is not very high. In the case of a three channel division, loss of any one channel is potentially even less noticeable because a switch can be made automatically to two channel operation.

Another advantage is realized in using coefficients 1 and $-1$ because they tend to simplify the circuit implementation of the transmitting and receiving apparatus. Other coefficients can, of course, be used without departing from the principles of this invention.

FIG. 1 depicts the transmitting and receiving apparatus for a two channel transmission of a wide band signal. Block 10 is the transmitting apparatus, developing a line 1 output signal and a line 2 output signal in response to a signal present on line 11. Within block 10, line 11 is applied to a low pass filter 12 and to a bandpass filter 13. Filter 12 is a conventional filter that covers the band from 0 to 3 KHz and develops a signal A. Filter 13 is also a conventional filter that covers the band from 3 KHz to 6 KHz and applies its output to amplitude modulator 14. Modulator 14 is also responsive to a carrier frequency $f_c$ of 3 KHz. The output of modulator 14 is applied to low pass filter 15 (identical to low pass filter 12) which yields a baseband signal B from 0 to 3 KHz. Signals A and B are added in arithmetic combining unit 16 to develop the line 1 output signal, and signals A and B are subtracted in arithmetic combining unit 17 to develop the line 2 output signal.

Block 20 is the receiving apparatus, developing a wide band output signal on line 21 in response to line 1 and line 2 input signals. The input signals to block 20 are subtracted in arithmetic combining unit 22 to recover the signal 2A. The input signals are also added in arithmetic combining unit 23; their sum is modulated by a 3 KHz carrier signal, $f_c$, in amplitude modulator 24 and, the modulation result is passed through bandpass filter 25 to recover the signal 2B. Bandpass filter 25 may be identical to bandpass filter 13. Recovered signals 2A and 2B are added in arithmetic combining unit 26 to develop the output signal on line 21.

Figure 2:
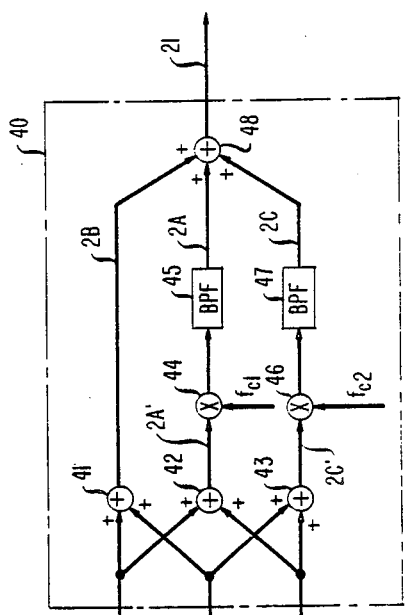
FIG. 2 illustrates transmitting and receiving apparatus employing three channels.

FIG. 2 depicts the transmitting and receiving apparatus for a three channel transmission of a wide band signal. Block 30 is the transmitting apparatus, developing a line 1, a line 2 and a line 3 output in response to a signal applied on line 11. Within block 30, line 11 is applied to a low pass filter 32 and to bandpass filters 31 and 33. Filter 32 covers the band from 0 to 2 KHz and develops a signal B. Filter 31 covers the band from 2 KHz to 4 KHz and applies its output to amplitude modulator 34. Modulator 34 is also responsive to a carrier frequency $f_{c1}$ of 2 KHz. The output of modulator 34 is applied to low pass filter 35 (identical to low pass filter 32) which yields a baseband signal A from 0 to 2 KHz. Filter 33 covers the band from 4 KHz to 6 KHz and applies its output to modulator 36. Modulator 36 is also responsive to a carrier frequency $f_{c2}$ of 4 KHz. The output of modulator 36 is applied to low pass filter 37 (identical to low pass filter 35) which yields a baseband signal C from 0 to 2 KHz. Signals A, B and C are combined in arithmetic combining units 38, 28, and 18 to develop signals $A+B-C$, $-A+B+C$, and $A-B+C$ on line 1, line 2 and line 3, respectively.

Block 40 is the receiving apparatus, developing a wide band output on line 21 in response to line 1, line 2 and line 3 input signals. The input signals of line 1 and line 2 are combined in adder 41 to recover the signal 2B; the input signals of line 1 and line 3 are combined in adder 42 to recover a signal 2A'; and the input signals of line 2 and line 3 are combined in adder 43 to recover a signal 2C'. The output signal of adder 42 is modulated by a 2 KHz carrier signal, $f_{c1}$, in amplitude modulator 44 and passed through bandpass filter 45 to recover the signal 2A. Similarly, the output signal of adder 43 is modulated by a 4 KHz carrier signal, $f_{c2}$, in amplitude modulator 46 and passed through bandpass filter 47 to recover the signal 2C. Bandpass filters 45 and 47 may be identical to bandpass filters 31 and 33, respectively. Recovered signals 2A, 2B and 2C are added in adder 48 to develop the output signal on line 21.

Although two specific embodiments have been described with specific multiplicative constants, it is understood that other embodiments are within the scope of my invention; including the use of the described apparatus for other than voice signals.

What is claimed is:

1. A signal conditioner responsive to a wide band signal for developing a plurality of narrow band signals representative of said wide band signal, comprising:
   first means responsive to said wide band signal for separating said wide band signal into N narrow band signals where N is a positive integer greater than 1;
   second means responsive to said first means for developing a baseband signal for each of said N narrow band signals, thus forming N baseband signals; and
   third means responsive to said second means for developing N combination signals, where each of said combination signals is a unique algebraic combination of said N baseband signals.

2. The conditioner of claim 1 wherein N is two, said second means develops a baseband signal A and a baseband signal B, and said third means develops a first combination signal corresponding to $A+B$ and a second combination signal corresponding to $A-B$.

3. The signal conditioner of claim 1 wherein said second means comprises $N-1$ processing elements, each of which is responsive to one of said narrow band signals and modulates the narrow band signal to which it is responsive by a different preselected carrier frequency to form a modulation result, and passes the modulation result through a low pass filter to develop said baseband signal.

4. A signal conditioner responsive to N baseband signals, N being a positive integer greater than 1 comprising:
   N processing units, each responsive to said N baseband signals and each algebraically combining said N baseband signals to develop a combination signal having a frequency band, thereby developing N combination signals;
   $N-1$ modulation means responsive to said processing units, each connected to a preselected one of said combination signals leaving a chosen one of said combination signals unconnected to any of said modulation means, for shifting the frequency band of its applied combination signal to develop narrow band signals; and
   means for combining said narrow band signals with said chosen one of said combination signals to develop a wide band signal.

5. The signal conditioner of claim 4 wherein each of said modulation means employs a unique modulation frequency to perform said shifting of the frequency band.

6. A signal conditioner responsive to a signal A that corresponds to an algebraic combination of a baseband signal C and a translated baseband signal D, and to a signal B that corresponds to an algebraic combination of said baseband signal C and the negative of said translated baseband signal D comprising:
   first arithmetic means responsive to signals A and B for developing an output signal equal to the sum of signals A and B;
   second arithmetic means responsive to signals A and B for developing an output signal equal to the difference of signals A and B;
   modulation means responsive to said second arithmetic means for shifting the input signal of said modulation means by a preselected frequency; and
   means for combining said output signal of said first arithmetic means with output signal of said modulation means to develop an output signal of said signal conditioner.

7. A communications system, having a transmitter and a receiver, for transmitting a wide band signal over a plurality of narrow band transmission channels, with said transmitter comprising:

first means responsive to said wide band signal for separating said wide band signals into N narrow band signals, where N is a positive integer, second means for developing a baseband signal corresponding to each of said N narrow band signals thereby developing N baseband signals, and third means for developing N combination signals, where each of said combination signals is a unique algebraic combination of said N baseband signals; and said receiver comprising:

N processing units, each responsive to said N baseband signals and each algebraically combining said N baseband signals to develop a combination signal having a frequency band, thereby forming N combination signals, $N-1$ modulation means, each connected to a preselected one of said combination signals leaving a chosen one of said combination signals unconnected to any of said modulation means, for shifting the frequency band of its applied combination signal to develop narrow band signals, and means for combining said narrow band signals with said chosen one of said combination signals to develop a wide band signal.

* * * * *